W. S. REED.
COUPLING.
APPLICATION FILED JAN. 24, 1908.
910,416.
Patented Jan. 19, 1909.
2 SHEETS—SHEET 1.
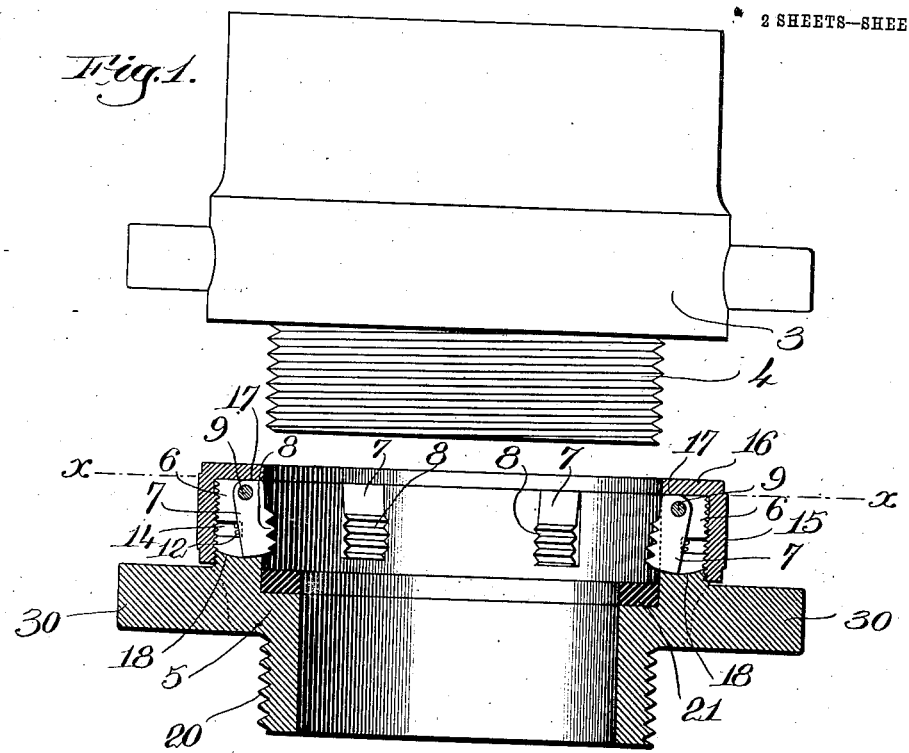
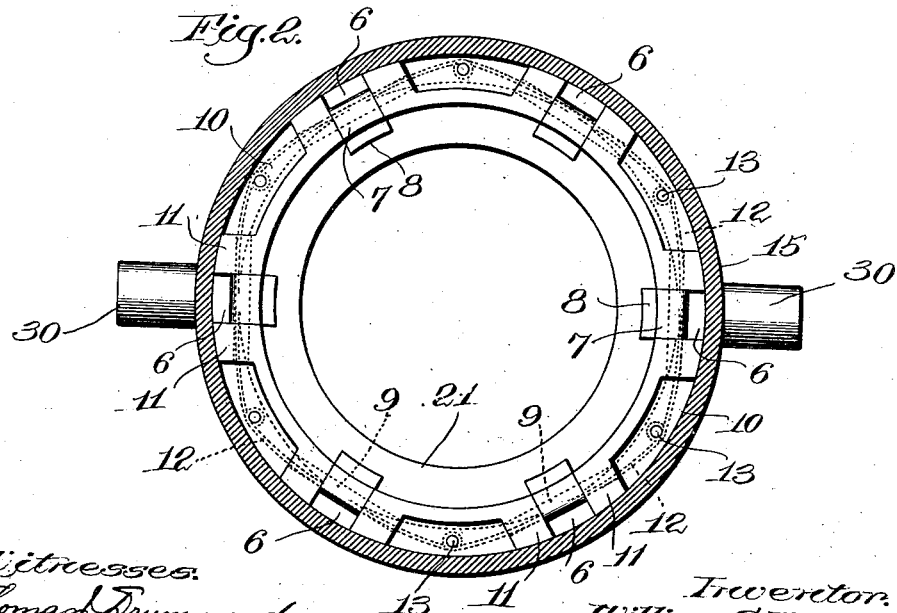
Witnesses.
Thomas J. Drummond
Joseph M. Ward
Inventor.
William S. Reed,
by Crosby Gregory
Attys.

W. S. REED.
COUPLING.
APPLICATION FILED JAN. 24, 1908.
910,416.
Patented Jan. 19, 1909.
2 SHEETS—SHEET 2.
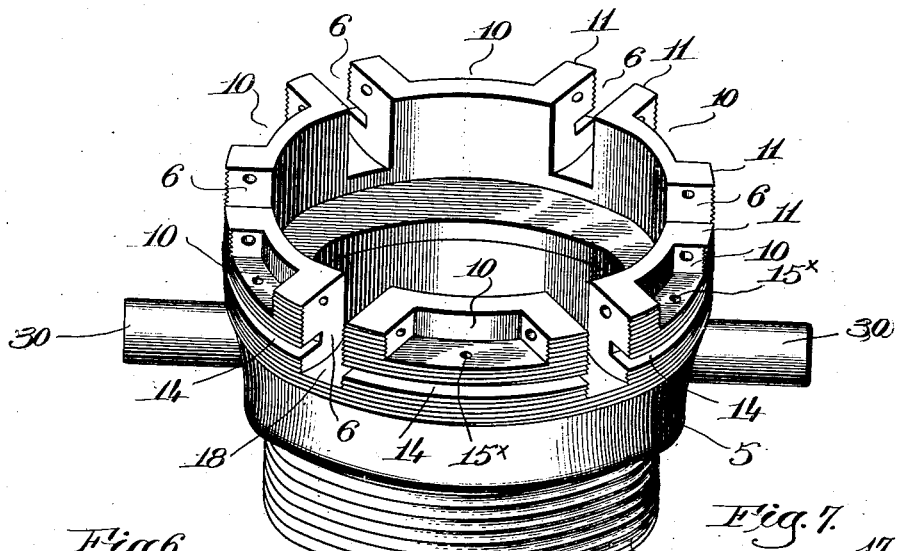
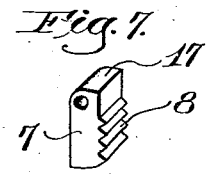
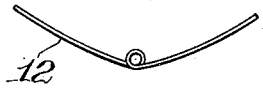
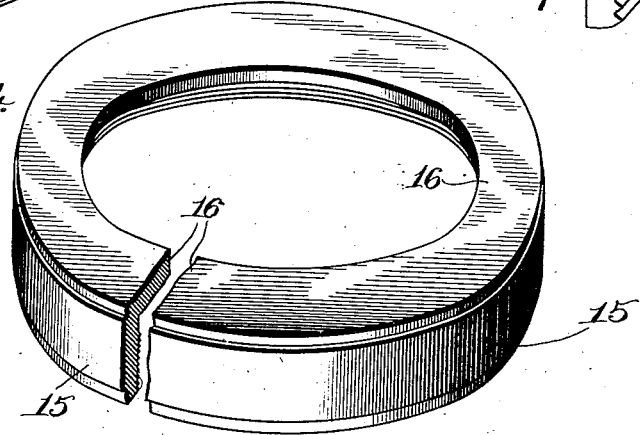
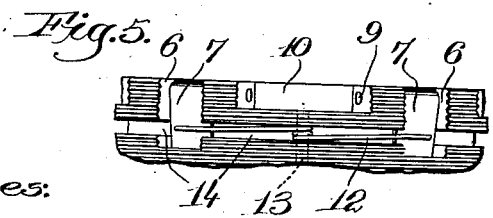
Witnesses:
Thomas J. Drummond
Joseph M. Ward
Inventor.
William S. Reed,
by Crosby & Gregory
attys.

UNITED STATES PATENT OFFICE.

WILLIAM S. REED, OF LEOMINSTER, MASSACHUSETTS, ASSIGNOR TO W. S. REED COUPLING COMPANY, A CORPORATION OF MAINE.

COUPLING.

No. 910,416.  Specification of Letters Patent.  Patented Jan. 19, 1909.

Application filed January 24, 1908. Serial No. 412,387.

*To all whom it may concern:*

Be it known that I, WILLIAM S. REED, a citizen of the United States, residing at Leominster, county of Worcester, and State of Massachusetts, have invented an Improvement in Couplings, of which the following description, in connection with the accompanying drawing, is a specification, like letters on the drawing representing like parts.

This invention relates to couplings for hose, pipes, etc., and the object of the invention is to provide a novel coupling of that type which permits the two members of the coupling to be coupled together by a relative longitudinal movement between them and without the necessity of screwing one onto the other.

In my improved coupling one of the coupling members is provided with a plurality of pivoted jaws which are situated in recesses formed in said coupling member and the exposed faces of which are shaped to grip and have engagement with the screw threads of the complemental coupling member. These pivoted jaws are so arranged that they yield backwardly thereby freely permitting the two coupling members to be coupled by a movement longitudinally of each other but any tendency to separate the members causes the jaws to firmly bite or grip the other member and thus the coupling members are securely held together.

In the preferred embodiment of my invention these pivoted jaws are arranged in a coupling member which is adapted to be screw-threaded to one of the members of an ordinary coupling, thus converting said member into a quick-acting coupling member with which the other member of the regular coupling can be connected simply by a longitudinal movement.

I will first describe one embodiment of my invention and then point out the novel features thereof in the appended claims.

In the drawings Figure 1 is a view of my improved coupling showing one member of the coupling in section; Fig. 2 is a section on line x—x, Fig. 1; Fig. 3 is a perspective view of the main body of said member with the parts removed; Fig. 4 is a perspective view of the removable ring hereinafter described; Fig. 5 is a partial side elevation of the main body member shown in Fig. 3; Fig. 6 is a view of the form of spring employed in connection with the pivoted jaw; Fig. 7 is a perspective view of one of the jaws.

My improvement may be embodied either in the male member or in the female member of a coupling. In the drawings, however, I have shown it as embodied in the female member of the coupling with which a male member 3 of any suitable or usual construction is to be coupled. Said male member is shown as having the exteriorly screw-threaded portion 4 which is adapted to fit into the female member.

In the embodiment of the invention herein shown this female member is provided with the body which is formed with a plurality of radial recesses 6.

Situated within each recess is a pivoted or swinging jaw 7 which is arranged to engage the screw-threaded portion 4 of the male member when the parts are coupled together. These jaws 7 are pivoted at their outer ends to the body, and the axes of the pivots are situated back from the exposed faces 8 of the jaws. Said jaws may be pivoted to the body in any suitable way, and I have herein shown each jaw as mounted on a pivotal pin 9 which is secured in the body.

For convenience in making and assembling the parts, the body may be made in two sections, an inner section 5 which has the recesses 6 therein and which is seen in Fig. 3, and an outer section 15 which is adapted to be screw-threaded onto the inner section from the outer end thereof and which encircles and covers the recesses and jaws. The recesses 6 are preferably cut clear through the wall of the inner section and are also open at the end of said wall, and said inner section is cut away at 10 between each two adjacent recesses thereby to form the flanges 11 in which the pins 9 may be sustained. The pins can be easily inserted into these flanges from the recesses 10 as will be obvious. When the two sections of the body are screwed together, the outer section covers completely the recesses 6 and the jaws 7, and the flange 16 of the outer section overlies the end face of the inner section.

The jaws 7 are preferably backed by suitable springs which tend to swing them inwardly, and while a spring of any suitable construction may be employed, I have herein shown springs 12 of the form shown in Fig. 6. These springs are received in a groove 14 formed in the inner section 5 and are supported on pins 13 which are inserted into the apertures 15× formed in said section. The ends of the springs bear against the jaws 7, as plainly seen from Figs. 2 and 4. In this way each jaw has the ends of two springs bearing thereon.

Owing to the manner of mounting the jaws 7, it will be apparent that as the coupling member 3 is moved longitudinally of the member 5 the jaws 7 will swing backwardly to permit the two members to be coupled together, and when the members are fully coupled, the serrated faces of said jaws will engage the screw-threads 4. After the members are coupled any tendency to separate the members results in causing the jaws 7 to tend to swing inwardly thereby to more firmly grip the screw-threads 4. This is so because the pivotal points 9 of the jaws are situated at the outer ends thereof and back from the serrated faces 8.

After the members are firmly coupled any longitudinal strain tending to separate them is, of course, transmitted to the pivoted jaws 7, and my improvement provides a construction wherein means are provided for taking such longitudinal strain from the pintles 9.

In the present embodiment the outer member 15 is made use of to take the longitudinal thrust from the pins 9, this being accomplished by making the jaws of such a length that when the outer section 15 is in place, the ends 17 of the jaws 7 are in engagement with the flange 16, and by giving said ends 17 such a shape that this engagement is maintained in all positions of the jaws. The result of this construction is that any longitudinal thrust or strain to which the jaws 7 are subjected is transmitted directly to the flange 16 of the outer section 15 and thus the pintles 9 are relieved from strain. The ends 17 of said jaws are shaped so as to limit the inward swinging movement thereof, said jaws being shown swung inwardly to their limit in Fig. 1. Said jaws however can freely swing outwardly as will be obvious from the drawings.

In order to make the coupling a dust proof one the recesses 6 are of a shape to fit the jaws 7, and the inner ends 18 of said recesses are curved to fit the curved inner ends of the jaws. This makes a construction which excludes the dust and dirt from the recesses 6 so that there is no danger of the parts becoming clogged.

The regular female member of the coupling may be provided with my improvement, as above described, or this improvement may be embodied in a coupling member or coupling attachment such as shown in Figs. 1 and 3, which is formed with the exteriorly screw-threaded portion 20 that is of a shape to fit into the ordinary female coupling not shown. When the member constructed as shown in Fig. 1 is coupled to the ordinary female coupling, said coupling is converted into a quick-acting one which may be coupled to the male member of the coupling by a movement longitudinally thereof. After the members have been thus coupled by a longitudinal movement the coupling may be tightened as usual by turning the members slightly relative to each other.

The coupling member is shown as provided with the usual gasket 21 against which the end of the screw-threaded portion 4 seats. Said coupling member is also provided with the usual projections 30 by which it may be turned when it is to be tightened onto another coupling or unscrewed therefrom. These projections 30 may be formed on either the inner section 5 or the outer section 15. They are herein shown as being formed on the inner section 5.

I have not shown herein all embodiments of my invention but have merely illustrated the preferred embodiment.

Having fully described my invention, what I claim as new and desire to secure by Letters Patent is:—

1. A coupling member comprising a body provided with a series of comparatively narrow recesses spaced about the same, and jaws pivoted at their outer ends in said recesses, said jaws having exposed side faces shaped to constitute sections of a cylindrical screw-threaded surface.

2. A coupling member comprising a body provided with recesses, jaws extending longitudinally of the body and pivoted at their outer ends in said recesses, said jaws having exposed side faces shaped to constitute sections of a screw-thread, and an abutment surface to engage the ends of the jaws to take the longitudinal thrust to which the jaws are subjected.

3. A coupling member comprising a body provided with recesses and jaws extending longitudinally of the body and pivoted at their ends in said recesses, the inner side faces of said jaws being shaped to constitute sections of a screw-thread integral with said jaws, and the pivotal points of the jaws being situated in a circle of larger diameter than the screw-threaded faces, and means other than the pivots of the jaws to take the longitudinal thrust to which the jaws are subjected.

4. A coupling member presenting a body portion provided with radial recesses, jaws pivoted in said recesses to swing radially about axes transverse to the axis of said coupling member, said jaws having exposed faces shaped to constitute sections of a screw thread, and a thrust member associated with the body member and adapted to engage the jaws and take longitudinal thrust from the pivots thereof.

5. A coupling member comprising an inner section having a series of radially-arranged slots spaced about and extending through its wall, a series of receding jaws mounted in said slots, the inner faces of the jaws being shaped to constitute sections of the same screw-thread, and an outer section screw-threaded to the inner section from the outer end thereof and when in place covering said slots.

6. A coupling member comprising an inner section having a series of comparatively narrow radially-arranged slots extending through the walls thereof at one end, a plurality of jaws mounted in said slots, said jaws being pivoted at the outer ends of the slots, and an outer section screw-threaded to the inner section and covering the ends and outer sides of the slots.

7. A coupling member comprising an inner section having a series of comparatively narrow recesses formed in the wall thereof, said recesses being open at the end of said section, receding jaws mounted in said recesses, and an outer section screw-threaded on the inner section and overlying the end thereof.

8. A coupling member comprising an inner section having a series of comparatively narrow recesses formed in the wall thereof, said recesses being open at the end of said section, receding jaws mounted in said recesses, and an outer section screw-threaded on the inner section and overlying the end and the side thereof and covering the recesses.

9. In a coupling member, the combination with an inner section having a plurality of recesses open at the end thereof, jaws mounted in said recesses, said jaws having their exposed faces shaped to constitute sections of a screw-thread, and an outer section detachable from the inner section and overlying the end thereof, said outer section when in position engaging the jaws and being adapted to take the longitudinal thrust to which the jaws are subjected.

10. In a coupling member, the combination with an inner section having a plurality of recesses open at the end thereof, of jaws pivoted in said recesses at their outer ends, said jaws having their exposed faces shaped to constitute sections of a screw-thread, and an outer section detachably secured to the inner section and overlying the end thereof, said outer section being arranged to take the longitudinal thrust to which the jaws are subjected.

11. A coupling member comprising an inner section provided with a plurality of recesses and having a peripheral spring-receiving groove, a plurality of receding jaws mounted in said recesses, a plurality of separate springs in said groove for acting on the jaws, and an outer member detachably secured to the inner member and covering said groove and jaws.

12. A coupling member comprising an inner section provided with a plurality of recesses and also provided with a peripheral spring receiving groove, a plurality of receding jaws mounted in said recesses, and a plurality of springs situated in said groove, each spring being situated between two adjacent jaws and acting on each of said jaws, and an outer member detachably secured to the inner member and covering said groove and jaws.

13. A coupling member comprising an inner section provided with a plurality of recesses and also provided with a peripheral spring receiving groove, a plurality of receding jaws mounted in said recesses, a plurality of springs in said groove, each spring being situated between two adjacent jaws and being secured centrally thereof to said inner member whereby the ends of the spring act on both of said adjacent jaws and an outer member detachably secured to the inner member and covering said groove and jaws.

14. A coupling member comprising a body provided with recesses, jaws pivoted at their outer ends in said recesses, each jaw having its side face exposed and shaped to form a section of a screw-thread, and the outer end of each jaw being shaped to engage the end wall of the recess when the jaw swings inwardly, thereby to limit the inward swinging movement thereof.

15. A coupling member comprising an inner section provided with recesses open at the end of said section, jaws pivoted at their outer ends in said recesses, each jaw having its side face exposed and shaped to form a section of a screw-thread, and an outer section detachable from the inner section and provided with a flange to overlie the end of the inner section and form the end wall of said recesses, the outer ends of the jaws being shaped to engage said flange when the jaws swing inwardly, thereby to limit the inward swinging movement thereof.

In testimony whereof, I have signed my name to this specification, in the presence of two subscribing witnesses.

WILLIAM S. REED.

Witnesses:
  LOUIS C. SMITH,
  MARGARET A. DUNN.